United States Patent
Döring

(10) Patent No.: US 11,278,036 B2
(45) Date of Patent: Mar. 22, 2022

(54) BUTTER WITH CARAMEL FLAVOUR

(71) Applicant: DMK Deutsches Milchkontor GmbH, Zeven (DE)

(72) Inventor: Sven-Rainer Döring, Zeven (DE)

(73) Assignee: DMK Deutsches Milchkontor GmbH, Zeven (DE)

( * ) Notice: Subject to any disclaimer, the term of this patent is extended or adjusted under 35 U.S.C. 154(b) by 264 days.

(21) Appl. No.: 15/909,043

(22) Filed: Mar. 1, 2018

(65) Prior Publication Data
US 2018/0303110 A1  Oct. 25, 2018

(30) Foreign Application Priority Data

Apr. 24, 2017 (EP) .................................. 17167675

(51) Int. Cl.
| A23C 15/06 | (2006.01) |
| A23C 9/142 | (2006.01) |
| A23L 27/21 | (2016.01) |
| A23C 9/12  | (2006.01) |

(52) U.S. Cl.
CPC ............ *A23C 15/06* (2013.01); *A23C 9/1206* (2013.01); *A23C 9/1422* (2013.01); *A23C 9/1427* (2013.01); *A23L 27/215* (2016.08)

(58) Field of Classification Search
None
See application file for complete search history.

(56) References Cited

U.S. PATENT DOCUMENTS

| 2005/0181095 A1   | 8/2005  | Achs |
| 2010/0092646 A1 * | 4/2010  | Krauss ................ A23C 15/12 426/581 |
| 2013/0330460 A1   | 12/2013 | Criezis et al. |

FOREIGN PATENT DOCUMENTS

SG  194854 A1  12/2013

OTHER PUBLICATIONS

Tang et al., Preparation of lactose-free pasteurized milk with a recombinant thermostable β-glucosidase from Pyrococcus furiosus, Li et al. BMC Biotechnology 2013, 13:73 (Tang) (Year: 2013).*
Hammer et al., "Burnt or caramel flavor of dairy products," Research Bulletin 5(68) (Iowa Agriculture and Home Economics Experimental Station) 1921, pp. 147-156.

\* cited by examiner

*Primary Examiner* — Amber R Orlando
*Assistant Examiner* — Philip A Dubois
(74) *Attorney, Agent, or Firm* — Dilworth & Barrese, LLP

(57) ABSTRACT

A butter with caramel is suggested, which is obtainable or obtained by:
(a) separating whole milk into a skimmed milk fraction and a cream fraction by means of a separation step;
(b) subjecting the cream fraction such obtained to a nanofiltration (NF) step and/or a reverse osmosis (RO) step, obtaining a NF/RO retentate and a NF/RO permeate;
(c) subjecting the NF/RO retentate such obtained to a heat treatment step, in the process of which the sugar contained therein is caramelised at least in part; and
(d) churning the caramelised NF/RO retentate such obtained in a manner known per se.

13 Claims, No Drawings

BUTTER WITH CARAMEL FLAVOUR

FIELD OF THE INVENTION

The invention is in the field of dairy products and relates to a butter with caramel flavour, a process for the production thereof, and its use in the food sector.

STATE OF THE ART

Caramel is traditionally produced by heating dry granulated sugar (sucrose) in a frying pan at high heat while stirring constantly. When the sugar starts to melt, it just takes a few seconds until the caramel assumes its dark colour—therefore its production requires constant attention. As soon as the desired degree of browning has been achieved, the mass is deglazed with boiling water to form a syrup, in order to prevent it from solidifying at the end.

Although this is one of the most ancient processes of cooking, the chemistry of it has not been entirely understood to this date. Obviously, several reactions are taking place simultaneously, including a change in the mutarotation (which is an inversion in the case of sucrose), oxidations, condensation reactions, polymerisations, rearrangement reactions such as isomerisations and a partial pyrolysis; in the case of darker caramel even, increasingly, a carbonisation. The sugar is dehydrated, and the carbohydrates join to form various polymers, ketones and aldehydes, some of which are responsible for the brown colouring and the bitter taste. Therefore, caramel tastes more bitter the darker it is burnt. Characteristic odours are produced, for example, various dihydrofuranones, cyclopentenolones, cyclohexenolones and pyrones (e.g., maltol).

To give dishes a caramel taste, one typically proceeds as described above, which, however, has the disadvantage of losing control of the process such that a product is obtained which tastes bitter or even leaves a slightly burnt taste impression. For this reason, there is a need in the market for foods or ingredients for the production of foods having a caramel flavour, which already have this flavour and may easily convey it to the dishes that have been prepared with it.

Such food, which would be particularly suitable for this purpose, would be a "caramel butter", i.e. a commercially available butter having a caramel flavour. It could be used directly as a bread spread or serve cooking and baking purposes.

It is known that butter is produced from milk. Milk contains a small amount of sugar, so that one could consider to caramelise this amount wholly or partly, subsequently churning the caramelized milk. However, in practice, this does not succeed for the following reasons: during the production of skimmed milk a cream fraction is obtained having about 40% by weight fat and about 4% by weight dry matter, but the sugar content of no more than 2% by weight is far too low to produce a corresponding flavour by means of caramelisation. Alternatively, separation could be performed such that a cream fraction is obtained which contains only 10 to 20% by weight fat, but 15 to 16% by weight dry matter, half of which is sugar. The sugar content would be sufficient for caramelisation, but the fat content would be too low, so that it would be impossible to churn the product.

Ultimately, one could simply add caramel or caramel flavour could to the butter. This, however, would lead to the fact that the product would not comply with the German Butter Ordinance (Butterverordnung) and could only be sold as a butter composition. It is obvious that the consumer would much rather buy a "real" butter with a touch of caramel than a butter composition.

The task of the present invention was therefore to provide a butter on the basis of milk, having a caramel flavour on the one hand and complying with the Butter Ordinance on the other.

DESCRIPTION OF THE INVENTION

A first subject matter of the invention relates to a butter with a caramel flavour, obtainable or obtained by:
(a) separating whole milk into a skimmed milk fraction and a cream fraction by means of a separation step;
(b) subjecting the cream fraction such obtained to a nanofiltration (NF) step and/or a reverse osmosis (RO) step, obtaining a NF/RO retentate and a NF/RO permeate;
(c) subjecting the NF/RO retentate such obtained to a heat treatment step, in the process of which the sugar contained therein is caramelised at least in part; and
(d) churning the caramelised NF/RO retentate such obtained in a manner known per se.

A further subject matter of the invention relates to a corresponding process for the production of a butter with a caramel flavour, comprising or consisting of the following steps:
(a) separating whole milk into a skimmed milk fraction and a cream fraction;
(b) subjecting the cream fraction such obtained to a nanofiltration (NF) step and/or a reverse osmosis (RO) step, obtaining a NF/RO retentate and a NF/RO permeate;
(c) subjecting the NF/RO retentate such obtained to a heat treatment step, in the process of which the sugar contained therein is caramelised at least in part; and
(d) churning the caramelised NF/RO retentate such obtained in a manner known per se.

The suggested manner allows to provide a butter, which complies with the corresponding Order, by means of a technologically simple process, and in which the sugar that is naturally contained in the original milk is wholly or partly caramelised such that the final product has the desired caramel flavour. The process is simple in implementation and can be performed both discontinuously and continuously.

Separation

Separation is understood as the separation of the cream up to a fat content of about 0.05% by weight in the skim phase (skimmed milk) and the removal of non-lactic solids. Separation typically involves a pasteurization step, in which the raw milk is heated to a temperature of about 70 to 80° C., particularly about 72 to 74° C., for a residence time of a minimum of 15 seconds and a maximum of 60 seconds, preferably about 30 seconds.

The separation step can be performed in hot conditions at a temperature in the range of about 20 to about 60° C., or in cold conditions at a temperature of about 8 to about 20° C.

In the process according to the invention it is advantageous to perform the separation cold. In doing so, it is advantageous if the temperature of the cold condition of the raw milk is adjusted to a value that is optimal for separation by means of heat exchange using a heat carrier medium. Usually, the raw milk is available in a cooled condition, the temperature of which does not correspond to the value where cold separation can be performed most effectively and most gently with respect to the milk fat (cream). It is, therefore, adapted to the value that is optimal for separation by means of heat exchange. The exchanged cold temperature from the process may be made available to other processes that are carried out in a dairy, particularly by a so-called heat exchanger. For example, the temperature of the cooled raw milk does not exceed 6° C., while the optimum temperature for cold separation is in the range from 8 to 18° C. and particularly from 8 to 12° C. In this case, heat exchange is performed by heating the raw milk, so that the temperature of the cold condition thereof is increased to a value within this range. In dairies there usually is excess heat. Therefore, low-temperature water obtained in dairy processes can be used as a heat carrier medium for heating. Said low-temperature water is supplied to the heat exchange process at a temperature which is, for example, in the range of 35° C., and is then cooled down by heat exchange to a temperature which is, for example, in the range from 11 to 15° C. In doing so, the process of the invention provides an important cold source for dairy processes.

If the separation is performed hot, the preferred temperature is in the range from about 35 to about 75° C. and particularly from about 50 to about 60° C.

The separation of solids and the skimming of a fat content of about 4% by weight is usually carried out in a downstream component, preferably a separator. Said components are adequately known from the state of the art. Separators of the company GEA Westfalia Separator GmbH, which allow the joint or single separation of solids (http://www.westfalia-separator.com/de/anwendungen/molkereitechnik/milch-molke.html), are widely used in the dairy industry. Preferred cold milk separators are marketed by the manufacturer under the name "Procool". Corresponding components have also been disclosed, for example, in DE 10036085 C1 and DE 10361526 B3 (Westfalia) and are perfectly known to one skilled in the art. Therefore, no explanations are needed on how to carry out these process steps, as they are understood to be part of the general specialist knowledge.

The cream fraction obtained in the separation step, preferably, has at least 10, preferably, 20% by weight fat and at least 3% by weight fat-free dry matter.

Nanofiltration

The suitable fat content for the butter production (churning) is achieved by the downstream filtration step, as a fat content of above 42-45% by weight fat would significantly increase the losses experienced during churning. At the same time, the carbohydrate portion in the fat-free dry matter is increased. This guarantees that the rententate obtained has a carbohydrate portion sufficient to produce a corresponding caramel flavour.

Nanofiltration is a filtration process from the field of membrane technology, by means of which macro-molecular substances and small particles can be separated from a medium and concentrated. Microfiltration, ultrafiltration and nanofiltration are distinguished by means of their cut-off limit. If the cut-off limit (or also "Cut-off") is 100 nm or more, one is referring to microfiltration. If the cut-off limit is in the range between 2-100 nm, this is referred to as ultrafiltration. In the case of nanofiltration, the cut-off is below 2 nm. In each of these cases this concerns purely physical, i.e. mechanical, membrane separation methods which apply the principle of mechanical size exclusion: all particles in the fluids which are larger than the membrane pores are retained by the membrane. The driving force in both separation methods is the differential pressure between the inlet and the outlet of the filter area, which is between 0.1 and 10 bar.

The exclusion limits of nanofiltration membranes are also indicated in form of the NMWC (Nominal Molecular Weight Cut-Off, also referred to as MWCO, Molecular Weight Cut Off, unit: Dalton). It is defined as the minimal molecular mass of globular molecules, 90% of which are retained by the membrane. In practice, the NMWC should be at least 20% lower than the molecular mass of the molecule to be separated. Further qualitative statements about filtration can be made by means of the flux (water value) (transmembrane flux or passage rage). Ideally, it is proportional to the transmembrane pressure and reciprocal to the membrane resistance. These sizes are determined both by the characteristics of the membrane used and by concentration polarisation and possibly occurring fouling. The passage rate relates to 1 $m^2$ of membrane area. Its unit is $l/(m^2\ h\ bar)$ Membranes with pore sizes in the range of about 100 to about 5,000 Dalton, preferably, about 500 to about 2,000 Dalton are particularly suitable for nanofiltration.

The material of the filter area may represent stainless steel, polymer materials, ceramics, aluminium oxide or textile fabric. Filter elements appear in different forms: candle filters, flat membranes, spiral coil membranes, bag filters and hollow fibre modules, all of which are, in principle, suitable within the meaning of the present invention. However, spiral coil membranes made of polymer materials, or candle filters made of ceramics or aluminium oxide are preferably used.

Nanofiltration within the meaning of the present invention may be performed "hot" or "cold", i.e., within the temperature range from about 8 to about 20° C. or from about 20 to about 60° C. However, "cold" nanofiltration is preferred.

Reverse Osmosis

Alternatively or in addition, the cream fraction can also be subjected to a reverse osmosis step. Reverse osmosis is a physical membrane process for the concentration of substances dissolved in liquids, in the process of which the natural osmotic process is reversed by means of pressure.

The principle of the process is that the medium, in which the concentration of a particular substance is to be reduced, is separated by a semi-permeable membrane from the medium in which the concentration is to be increased. The latter is subjected to a pressure which must be higher than the pressure created by the osmotic pressure for concentration equilibration. As a result of this, the molecules of the solvent can migrate in opposite direction to their "natural" osmotic spreading direction. This process forces them into the compartment in which dissolved substances are present in a less concentrated form. Typical pressures of reverse osmosis are in the range from 3 to 30 bar (desalination of drinking water) or up to 80 bar (desalination of sea water).

The osmotic membrane through which only the carrier liquid (solvent) is allowed to pass, retaining the dissolved substances (solute), must be able to withstand these high pressures. In case the pressure difference more than balances the osmotic gradient, the molecules of the solvent are passing through the membrane just like in a filter, while the "contaminating molecules" are retained. In contrast to a classic membrane filter, osmotic membranes do not have through pores. The ions and molecules rather migrate through the membrane by diffusing through the membrane material, as is described by the solution-diffusion model: the osmotic pressure increases with an increasing concentration difference. If the osmotic pressure becomes equal to the applied pressure, the process ceases. An osmotic equilibrium is present. A continuous discharge of concentrate may prevent this from occurring. During the discharge of concentrate, the pressure is either controlled by means of a pressure controller or used by means of a pressure exchanger to accumulate the pressure required at the inflow of the system.

The retentate obtained in the nanofiltration step or the reverse osmosis step, preferably, has at least 15% by weight dry matter and at least 10% by weight sugar and a fat content of about 40% by weight.

Hydrolysis

The retentate contains the sugar in the form of milk sugar, i.e. lactose. Lactose belongs to the group of disaccharides and consists of the two molecules D-galactose and D-glucose, which are bonded by a β-1,4-glycosidic bond.

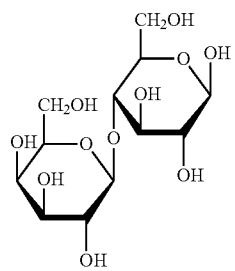

In another preferred embodiment of the present invention it is recommendable if lactase is added to the NF/RO retentate before the heat treatment step and to subject it to a hydrolysis step. This has the advantage that two molecules are formed from one milk sugar molecule, i.e. one molecule glucose and galactose each, as a result of which the degree of sweetness doubles.

In order to perform a decomposition into the two sugar components, the enzyme lactase (also referred to as LPH or LCT) is added to lactose. Hydrolysis is, preferably, performed in a stirred tank reactor with a continuous inlet and outlet as well as a dosing device for adding the enzyme and a valve arranged at the bottom of the reactor for discharging the deactivated enzyme which deposits in the course of time. It has proved to be advantageous to use an efficient enzyme concentration of about 180,000 to 250,000 FCC units of lactase per kg of lactose to be hydrolysed, and to perform the reaction at temperatures in the range of about 4 to about 65° C. and, preferably, in the range of 20 to 30° C. and with a slightly acid pH value of about 5 to 6.

Heat Treatment

Subsequently, the NF/RO retentate or the hydrolysate obtained thereof is subjected to a heat treatment step with the intention to wholly or partly caramelize the sugar contained therein, thus producing the corresponding flavour. Said treatment can be performed in a stirred tank reactor or in a heat exchanger, where the temperature is usually in the range of about 60 to about 125° C. and, preferably, about 75 to about 120° C., while the duration usually is about 10 to about 30 minutes and, preferably, about 20 to about 25 minutes.

The whole process, from the separation step to the heat treatment step, can be performed wholly discontinuously or either wholly or partly continuously.

Butter Production

Churning the heat-treated retentate can be performed in a manner known per se. During the butter production process, the fat-containing retentate is agitated. As a result, the fat globules of the milk fat are damaged. The membrane surrounding the fat breaks open and the contained fat leaks out. The fat conjoins, in the process of which parts of the fat membranes, water, and some milk protein are enclosed. The liquid fat-in-water emulsion becomes a solid water-in-fat emulsion. The by far largest of these fat-free components (whey) leaks out as buttermilk. The butter itself is eventually kneaded to form a homogeneous, smooth mass, which is subsequently formed and packaged.

The cream or the fat-containing retentate is agitated in industrial butter-making machines, which consist of a butter working roller, a drum and a kneader; the butter is separated and kneaded. Subsequently, the butter is formed and packaged in a butter-forming machine. Buttermilk, which can also have a caramel flavour, is obtained as a by-product of the churning process.

INDUSTRIAL APPLICATION

A further subject matter of the invention relates to the use of the butter according to the invention as a food, preferably, as a bread spread, or for the production of foods having a caramel flavour, particularly, baked products.

EXAMPLES

Example 1

2,000 kg raw milk were cooled down to 6° C. and within 40 seconds heated to 55° C. by means of a plate heat exchanger. The pre-heated milk was fed into a separator where the cream was separated. 400 kg of a cream fraction having a fat content of 20% by weight and a fat-free dry matter of 6% by weight were obtained, wherein half of the dry matter consisted of lactose. The cream fraction was fed to a nanofiltration unit which was equipped with a spiral coil membrane of 1,000 Dalton. The cream fraction was filtered at 10° C., in the process of which 200 kg permeate were obtained which were processed in another manner, and 200 kg retentate having 40% by weight fat and a content of 12% fat-free dry matter were obtained, about 7-8% by weight of which consisted of lactose. The retentate was fed into a plate heat exchanger and heated there to a temperature of 100° C. for a period of about 20 minutes. The emerging product had a light-brown colour and a distinct caramel flavour, both with respect to the odour and the flavour. Up to this point, the process was performed continuously. The heat-treated product was fed to a butter-making machine and processed there at room temperature, obtaining a finished caramel butter.

Example 2

Example 1 was repeated, however, the NF retentate was fed into a continuous enzyme reactor according to EP 2907393 A1 (DMK) before the heat treatment step, where lactase was added to it in an amount of about 200,000 FCC units per kg of lactose to be hydrolysed. The pH value was set to 5, and hydrolysis was performed at 65° C. The hydrolysed retentate was further processed as described above. In comparison with the end product of example 1, the caramel butter was characterized by more sweetness and a more distinct caramel flavour.

The invention claimed is:

1. A process for the production of a butter with caramel flavour, comprising the following steps:
   (a) separating whole milk into a skimmed milk fraction and a cream fraction;
   (b) subjecting the cream fraction such obtained to a nanofiltration (NF) step and/or a reverse osmosis (RO) step, obtaining a NF/RO retentate and a NF/RO permeate, wherein the nanofiltration step is performed by a membrane having a pore size in the range of about 100 to about 5,000 Dalton and then adding lactase to the NF/RO retenate to obtain a NF/RO rentenate and then subjecting the lactase-added NF/RO retentate to a hydrolysis step;

(c) subjecting the NF/RO retentate such obtained to a heat treatment step, in the process of which the sugar contained therein is caramelised at least in part, wherein the heat treatment step is performed at a temperature in the range of about 60 to about 125° C. for a duration of about 10 to about 30 minutes; and (d) churning the caramelised NF/RO retentate to obtain butter.

2. The process of claim 1, wherein the separation step is performed either in the range of temperature of about 8 to about 20, or about 20 to about 60° C.

3. The process of claim 1, wherein a cream fraction is produced during the separation step having at least 10% by weight fat and at least 3% by weight dry matter.

4. The process of claim 1, wherein the nanofiltration step is performed at a temperature in the range of about 8 to about 20° C., or about 20 to about 60° C.

5. The process of claim 1, wherein the reverse osmosis step is performed at a pressure of about 3 to about 80 bar.

6. The process of claim 1, wherein the reverse osmosis step is performed at a temperature in the range of about 8 to about 20° C., or about 20 to about 60° C.

7. The process of claim 1, wherein a retentate having at least 15% by weight dry matter and at least 10% by weight sugar is produced in the nanofiltration step and/or reverse osmosis step.

8. The process of claim 1, wherein the heat treatment step is performed in a stirred tank reactor or a heat exchanger.

9. The process of claim 1, wherein the process is performed continuously, semi-continuously or discontinuously.

10. The process of claim 1, comprising the step of using the butter thus-obtained as a food, or for the production of foods having a caramel flavour.

11. The process of claim 1, wherein the retentate produced in the nanofiltration step and/or reverse osmosis step has at least 40% by weight fat content.

12. The process of claim 1, wherein the nanofiltration step (b) is performed by a membrane having a pore size in the range of about 500 to about 2,000 Dalton.

13. A process for the production of a butter with caramel flavour, consisting of the following steps:

(a) separating whole milk into a skimmed milk fraction and a cream fraction;

(b) subjecting the cream fraction such obtained to a nanofiltration (NF) step and/or a reverse osmosis (RO) step, obtaining a NF/RO retentate and a NF/RO permeate, wherein the nanofiltration step is performed by a membrane having a pore size in the range of about 100 to about 5,000 Dalton and then adding lactase to the NF/RO retenate to obtain a NF/RO rentenate and then subjecting the lactase-added NF/RO retentate to a hydrolysis step;

(c) subjecting the NF/RO retentate such obtained to a heat treatment step, in the process of which the sugar contained therein is caramelised at least in part, wherein the heat treatment step is performed at a temperature in the range of about 60 to about 125° C. for a duration of about 10 to about 30 minutes; and (d) churning the caramelised NF/RO retentate to obtain butter.

* * * * *